United States Patent [19]

Drewery

[11] 4,194,219
[45] Mar. 18, 1980

[54] NOISE REDUCTION IN ELECTRICAL SIGNALS

[75] Inventor: John O. Drewery, Coulsdon, England

[73] Assignee: British Broadcasting Corporation, London, England

[21] Appl. No.: 883,406

[22] Filed: Mar. 6, 1978

[30] Foreign Application Priority Data

Mar. 7, 1977 [GB] United Kingdom ............... 9537/77

[51] Int. Cl.² ............................................. H04N 5/21
[52] U.S. Cl. .................................................. 358/167
[58] Field of Search ................... 358/36, 37, 162, 166, 358/167; 328/162, 163

[56] References Cited

U.S. PATENT DOCUMENTS 4,058,836  11/1977  Drewery et al. .................... 358/167
4,064,530  12/1977  Kaiser .................................. 358/36

*Primary Examiner*—Robert L. Griffin
*Assistant Examiner*—Joseph A. Orsino, Jr.
*Attorney, Agent, or Firm*—Robert F. O'Connell

[57] ABSTRACT

Reduction of noise in a television signal is achieved by comparing signals from successive scans and noting the differences. Low amplitude differences are assumed to represent noise and are attenuated. Differences above a predetermined level are assumed to represent movement and are not so attenuated. The attenuation is achieved by a multiplier which receives as multiplier the output of a non-linear transfer characteristic element. The non-linear element receives the differences after rectification and after passing through a variable-gain element. The ncn-linear element is such that above a predetermined value a constant predetermined minimum attenuation factor applies.

54 Claims, 3 Drawing Figures ial patent, and thus three different improvements to said earlier patent are herein described.

NOISE REDUCTION IN ELECTRICAL SIGNALS

BACKGROUND OF THE INVENTION

This invention relates to a method of and apparatus for reducing the effect of noise in an electrical input signal which is obtained by scanning, such as a television signal, and in particular is concerned with improvements in and modifications of the invention of U.S. Pat. No. 4,058,836; Inventors Martin Weston and myself.

Said earlier patent describes and claims a method of and apparatus for reducing the effect of noise in an electrical input signal which is obtained by scanning, to provide an output signal, in which the output signal for a preceding scan is subtracted from the input for the current scan to provide a difference signal, low-amplitude portions of the difference signal are attenuated relative to high amplitude portions thereof, and the thus-attenuated signal is added to the said output signal for the preceding scan to provide an output signal for the current scan.

The attenuation is preferably achieved by a multiplier one input of which is coupled to the subtractor output and the other input of which is coupled to the output of a non-linear transfer characteristic element which is also coupled to the subtractor output, preferably via a low-pass filter.

SUMMARY OF THE INVENTION

An object of this invention is to provide improvements to the system of said earlier patent, for reasons hereinafter apparent.

In this invention a rectifier is included between the subtractor output and the input to the non-linear transfer characteristic element. The non-linear transfer characteristic element is such that above a predetermined value a constant predetermined minimum attenuation factor applies. Furthermore a variable gain control is included between the low-pass filter and the non-linear element.

BRIEF DESCRIPTION OF THE DRAWINGS

This invention will be described in more detail, by way of example, with reference to the accompanying drawings, in which.

Figure 1:
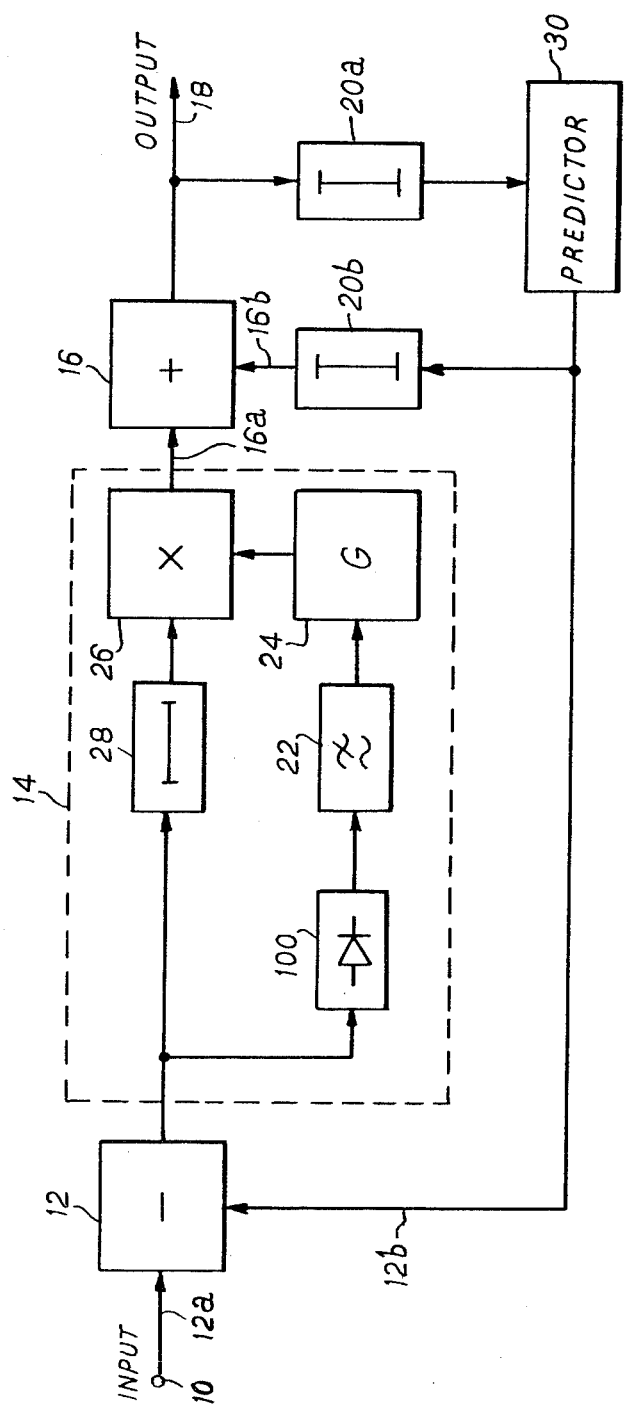
FIG. 1 is a block circuit diagram of noise-reduction apparatus embodying the invention in its first aspect, and based on FIG. 5 of the drawings of said earlier U.S. Pat. No. 4,058,836.

Referring to the example shown in FIG. 1, the input 10, subtractor 12, delay 28, multiplier 26, filter 22, function generator 24, adder 16, delays 20a and 20b, predictor 30 and output 18 are all identical to the same-numbered elements shown in FIG. 5 of the drawings of said earlier patent, to which reference should be made for a full description of them. Briefly, assuming that the scanned signal is an interlaced-scan television signal, each input signal has subtracted from it in subtractor 12 the output signal for the preceding picture period as supplied by the delay device 20a to produce a difference signal representing the differences between the current and preceding picture periods. This difference signal is passed through the attenuator 14 which is arranged to attenuate low-amplitude difference signals by a greater factor than high-amplitude difference signals, and the thus-attenuated signal is then added back in adder 16 to the output signal for the preceding picture to provide the output signal for the current picture.

Thus, low-amplitude difference signals are assumed to represent noise and are attenuated. High amplitude difference signals are assumed to represent movement and suffer less attenuation.

I have now found that improved operation results from including a rectifier 100 between the subtractor 12 and the low-pass filter 22. The filter 22 is here assumed to be a 2-dimensional transversal filter, so that the filter output which is associated with any picture point is derived from the values over an area of the picture in the neighbourhood of that point. The effect of the rectifier 100, which takes the modulus of the applied signal is to produce approximately a measure of the root mean square (RMS) value of the difference signal at the filter output. Strictly this is true only for an equal-coefficient transversal filter with the filter input samples uncorrelated. In this way a measure of the power of the difference signal is obtained. This I have found to give subjectively improved noise reduction.

In the FIG. 1 embodiment, the non-linear transfer characteristic element (e.g. circuit 24) is such that above a predetermined value a constant predetermined minimum attenuation factor applies, preferably equal to unity (i.e. no attenuation).

Figure 2:
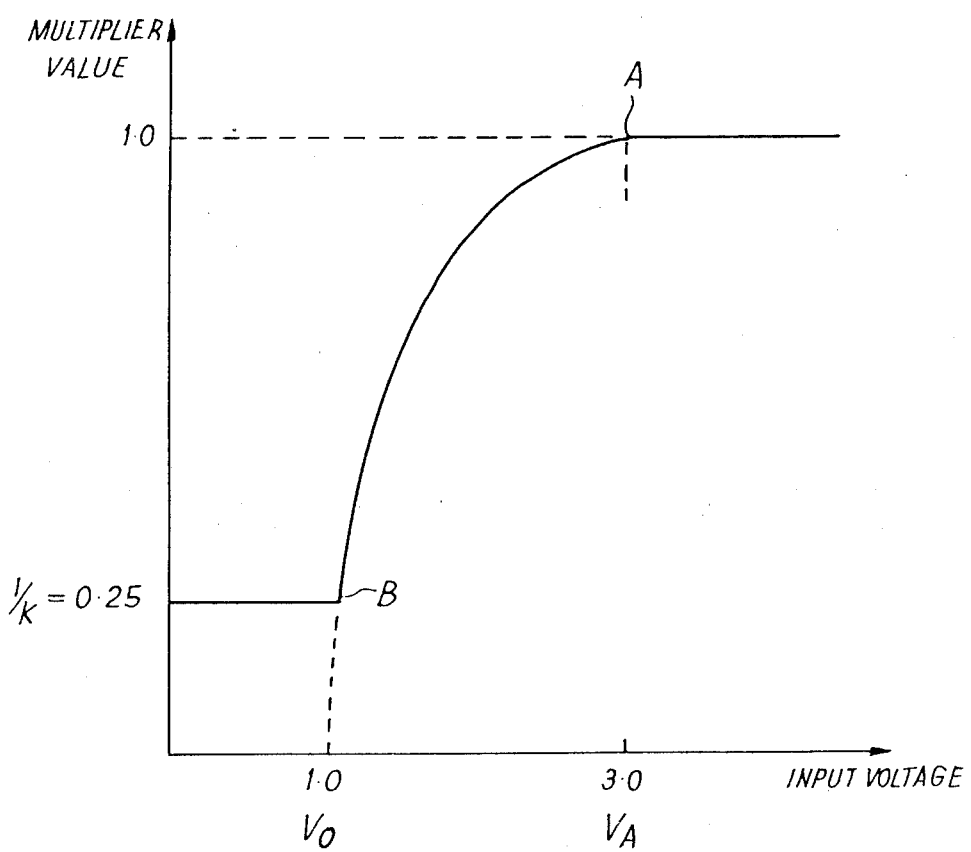
FIG. 2 shows the transfer characteristic of a circuit element which can be used in FIG. 1.

FIG. 2 shows a transfer characteristic having this feature, and plots the multiplier value of multiplier 26 against the voltage applied to the circuit 24, the latter being expressed in arbitrary units. It is seen that at a voltage of 3 units the multiplier value becomes unity (point A) and holds this value for higher input signals. Thus there is a discontinuity in slope at point A, as clearly seen in FIG. 2. This contrasts with FIG. 4 of the drawings of said earlier patent, where the curve approached unity asymptotically. The shape of the curve between point A and the point B where the predetermined maximum attenuation obtains is given by the function $(9/8)(-x^{-2})$, where x is the voltage in arbitrary units. The (9/8) multiplier in this expression can be replaced by another constant C whose value lies between 1 and 2.

It is preferred that the input voltage $V_A$ at which the curve reaches its final value should be related to the voltage $V_O$ where the curve intersects the abscissa by a factor or ratio of at least $\sqrt{2}$ and preferably less than 4. As shown in FIG. 2, this factor is 3.

In FIG. 2 the attenuation factor K for low-amplitude signals approaching zero is taken to be 4.

Figure 3:
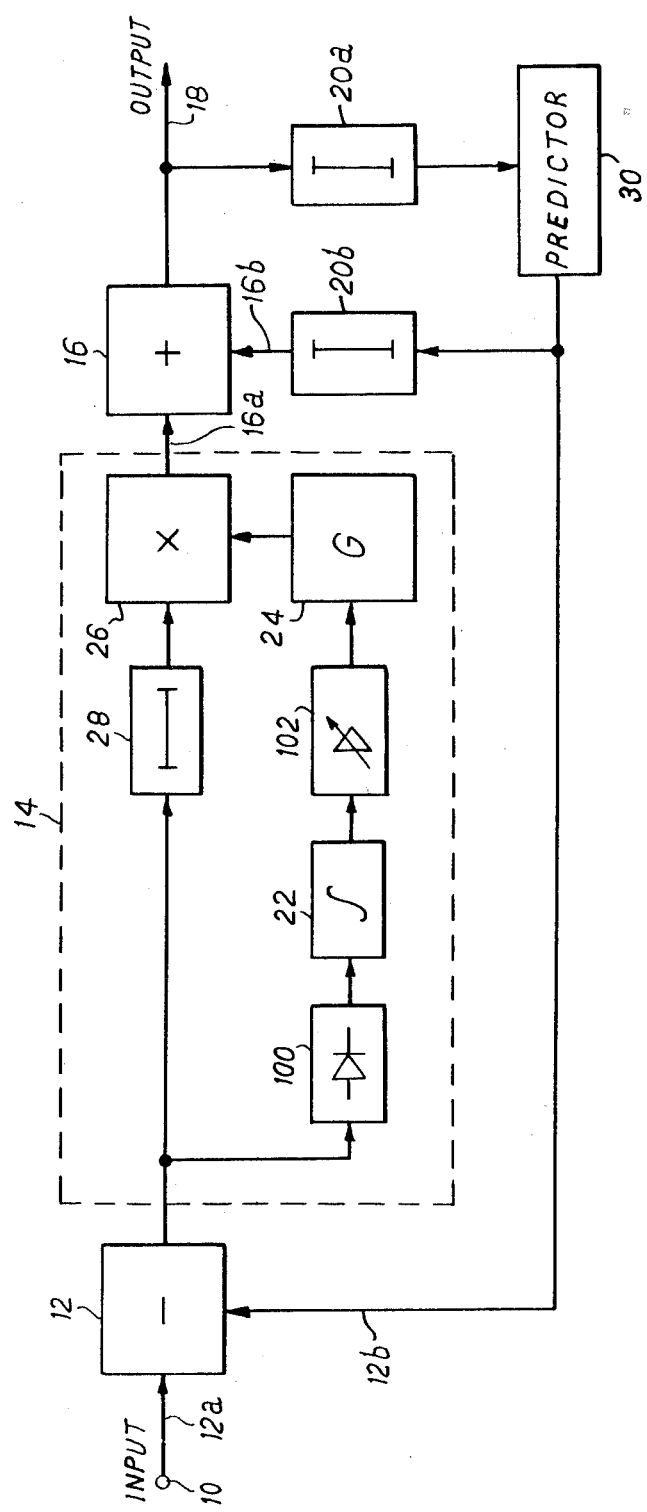
FIG. 3 is a block circuit diagram of a modification of the apparatus of FIG. 1.

In the embodiment of FIG. 3, a variable gain control is included between the low-pass filter and the non-linear characteristic transfer element. The filter 22 again takes the form of a two-dimensional averager, and a variable-gain amplifier 102 is included between the filter 22 and the circuit 24. As used with the rectifier 100, the gain is manually adjusted so that the RMS value of the difference signal corresponding to the noise level lies at the point B where the non-linear characteristic begins to rise. The motion detector is then optimally sensitive to motion. In practice the finite spread of the RMS signal may require it to be set somewhat above or below this point, depending on the exact compromise noise reduction and loss of moving detail.

The three modifications described can thus be applied independently to the method and apparatus of said earlier patent. They are, however, preferably used in combination, and they help to ensure that:

(i) the multiplier value varies between the basal value and unity in a slow and controlled way, well covering the area of movement; in this way the picture-to-picture integration is satisfactorily switched on and off;

(ii) no peculiar effects occur for certain moving patterns, such as gratings, which might not activate the movement detector of our earlier application; and (iii) moving texture is detected even when it produces a quasi-random picture-difference like noise.

With the apparatus of said earlier patent the "texture" signals would have been lost by the filter and so not have activated the movement detector. However, their presence can be detected by power measurement, because their random nature still increases the power of the picture-difference signal.

I claim:

1. Apparatus for reducing the effect of noise in an electrical signal which is obtained by scanning, said apparatus comprising:
   input and output terminals;
   a delay device coupled to the output terminal for providing a delay time of substantially one scan;
   a subtractor coupled to the input terminal and to the output of the delay device for providing a difference signal representative of the difference between the input signal during the current scan and the output signal during a preceding scan;
   an attenuation circuit coupled to the output of the subtractor and arranged to attenuate low-amplitude portions of the difference signal relative to high-amplitude portions thereof; and
   an adder having inputs coupled to the outputs of the attenuation circuit and of the delay device and having an output coupled to the output terminal;
   the attenuation circuit comprising:
      rectifying means and a variable gain element forming a series circuit coupled to the output of the subtractor;
      a non-linear transfer characteristic element couled to the output of the series circuit, the non-linear element having a characteristic such that above a predetermined value a constant predetermined minimum attenuation factor applies; and
      a multiplier one input of which is coupled to the subtractor output and the other input of which is coupled to the output of the non-linear transfer characteristic element the output of the multiplier forming the output of the attenuation circuit.

2. Apparatus as claimed in claim 1, wherein the predetermined minimum attenuation factor is unity.

3. Apparatus as claimed in claim 2, wherein below a second predetermined value a constant maximum attenuation factor applies, and between the first and second predetermined values the attenuation factor follows a curve given substantially by the function:

$$C(1-x^{-2})$$

where x is the voltage in arbitrary units, and C is a constant whose value lies between 1 and 2.

4. Apparatus as claimed in claim 3, wherein if the curve is continued to a point of infinite attenuation (zero amplification) the corresponding voltage $V_O$ is related to the voltage $V_A$ at the first predetermined value by a ratio of at least $\sqrt{2}$.

5. Apparatus as claimed in claim 4, wherein the ratio is less than 4.

6. Apparatus as claimed in claim 2, wherein below a second predetermined value a constant maximum attenuation factor applies, and between the first and second predetermined values the attenuation factor follows a curve, which, if continued to a point of infinite attenuation (zero amplification), gives the corresponding voltage $V_O$ which is related to the voltage $V_A$ at the first predetermined value by a ratio of at least $\sqrt{2}$.

7. Apparatus as claimed in claim 6, wherein the ratio is less than 4.

8. Apparatus as claimed in claim 1, including a low-pass filter coupled in the series circuit between the subtractor and the non-linear transfer characteristic element.

9. Apparatus for reducing the effect of noise in an electrical signal which is obtained by scanning, said apparatus comprising:
   input and output terminals;
   a delay device coupled to the output terminal for providing a delay time of substantially one scan;
   a subtractor coupled to the input terminal and to the output of the delay device for providing a difference signal representative of the difference between the input signal during the current scan and the output signal during a preceding scan;
   an attenuation circuit coupled to the output of the subtractor and arranged to attenuate low-amplitude portions of the difference signal relative to high-amplitude portions thereof; and
   an adder having inputs coupled to the outputs of the attenuation circuit and of the delay device and having an output coupled to the output terminal;
   the attenuation circuit comprising:
      rectifying means coupled to the output of the subtractor;
      a non-linear transfer characteristic element coupled to the output of the rectifying means; and
      a multiplier one input of which is coupled to the subtractor output and the other input of which is coupled to the output of the non-linear transfer characteristic element the output of the multiplier forming the output of the attenuation circuit.

10. Apparatus as claimed in claim 9, wherein the non-linear element has a characteristic such that above a predetermined value a constant predetermined minimum attenuation factor applies.

11. Apparatus as claimed in claim 9, including a low-pass filter coupled in series with the rectifying means between the subtractor and the non-linear element.

12. Apparatus as claimed in claim 9, including a variable-gain element coupled between the output of the rectifying means and the non-linear element.

13. Apparatus as claimed in claim 12, including a low-pass filter coupled between the output of the rectifying means and the non-linear element.

14. Apparatus for reducing the effec of noise in an electrical signal which is obtained by scanning, said apparatus comprising:
   input and output terminals;
   a delay device coupled to the output terminal for providing a delay time of substantially one scan;
   a subtractor coupled to the input terminal and to the output of the delay device for providing a difference signal representative of the difference between the input signal during the current scan and the output signal during a preceding scan;

an attenuation circuit coupled to the output of the subtractor and arranged to attenuate low-amplitude portions of the difference signal relative to high-amplitude portions thereof; and an adder having inputs coupled to the outputs of the attenuation circuit and of the delay device and having an output coupled to the output terminal;

the attenuation circuit comprising:

a non-linear transfer characteristic element coupled to the output of the subtractor, the non-linear element having a characteristic such that at a predetermined value there is a discontinuity in the slope of the characteristic above which a constant predetermined minimum attenuation factor applies; and a multiplier one input of which is coupled to the subtractor output and the other input of which is coupled to the output of the non-linear transfer characteristic element the output of the multiplier forming the output of the attenuation circuit.

15. Apparatus as claimed in claim 14, wherein the predetermined minimum attenuation factor is unity.

16. Apparatus as claimed in claim 15, wherein below a second predetermined value a constant maximum attenuation factor applies, and between the first and second predetermined values the attenuation factor follows a curve given substantially by the function:

$$C(1-x^{-2})$$

where x is the voltage in arbitrary units, and C is a constant whose value lies between 1 and 2.

17. Apparatus as claimed in claim 16, wherein if the curve is continued to a point of infinite attenuation (zero amplification) the corresponding voltage $V_O$ is related to the voltage $V_A$ at the first predetermined value by a ratio of at least $\sqrt{2}$.

18. Apparatus as claimed in claim 17, wherein the ratio is less than 4.

19. Apparatus as claimed in claim 15, wherein below a second predetermined value a constant maximum attenuation factor applies, and between the first and second predetermined values the attenuation factor follows a curve, which, if continued to a point of infinite attenuation (zero amplification), gives the corresponding voltage $V_O$ which is related to the voltage $V_A$ at the first predetermined value by a ratio of at least $\sqrt{2}$.

20. Apparatus as claimed in claim 19, wherein the ratio is less than 4.

21. Apparatus as claimed in claim 14, including a low-pass filter coupled between the subtractor and the non-linear element.

22. Apparatus as claimed in claim 21, wherein the low-pass filter comprises a two-dimensional averager.

23. Apparatus for reducing the effect of noise in an electrical signal which is obtained by scanning, said apparatus comprising:

input and output terminals;

a delay device coupled to the output terminal for providing a delay time of substantially one scan;

a subtractor coupled to the input terminal and to the output of the delay device for providing a difference signal representative of the difference between the input signal during the current scan and the output signal during a preceding scan;

an attenuation circuit coupled to the output of the subtractor and arranged to attenuate low-amplitude portions of the difference signal relative to high-amplitude portions thereof; and an adder having inputs coupled to the outputs of the attenuation circuit and of the delay device and having an output coupled to the output terminal;

the attenuation circuit comprising:

a variable-gain element coupled to the output of the subtractor;

a non-linear transfer characteristic element coupled to the output of the variable-gain element; and a multiplier one input of which is coupled to the subtractor output and the other input of which is coupled to the output of the non-linear transfer characteristic element the output of the multiplier forming the output of the attenuation circuit.

24. Apparatus as claimed in claim 23, wherein the non-linear element has a characteristic such that above a predetermined value a constant predetermined minimum attenuation factor applies.

25. Apparatus as claimed in claim 23, including a low-pass filter coupled in series with the rectifying means between the subtractor and the non-linear element.

26. Apparatus as claimed in claim 3, wherein the constant C has a value of about (9/8).

27. Apparatus as claimed in claim 16, wherein the constant C has a value of about (9/8).

28. Apparatus for reducing the effect of noise in an electrical signal which is obtained by scanning, said apparatus comprising:

input and output terminals;

a delay device coupled to the output terminal for providing a delay time of substantially one scan; and means coupled to the input terminal and to the output of the delay device for attenuating differences between the input signal during the current scan and the output signal during a preceding scan to provide an output signal which is applied to the output terminal;

said means including a subtractor coupled to the input terminal and to the output of the delay device for providing a difference signal, and an attenuation circuit operative to provide a varying degree of attenuation in dependence upon said difference signal;

the attenuation circuit comprising:

rectifying means and a variable gain element forming a series circuit coupled to the output of the subtractor;

non-linear transfer characteristic means coupled to the output of the series circuit, the non-linear means having a characteristic such that above a predetermined value a constant predetermined minimum attenuation factor applies;

multiplier means coupled to the output of the non-linear transfer characteristic means; and an adder coupled between the output of the multiplier means and the output terminal.

29. Apparatus as claimed in claim 28, wherein the predetermined minimum attenuation factor is unity.

30. Apparatus as claimed in claim 29, wherein below a second predetermined value a constant maximum attenuation factor applies, and between the first and second predetermined values the attenuation factor follows a curve given substantially by the function
ti $C(1-x^{-2})$ where x is the voltage in arbitrary units, and C is a constant whose value lies between 1 and 2.

31. Apparatus as claimed in claim 30, wherein the constant C has a value of about (9/8).

32. Apparatus as claimed in claim 30, wherein if the curve is continued at a point of infinite attenuation (zero amplification) the corresponding voltage $V_O$ is related to the voltage $V_A$ at the first predetermined value by a ratio of at least $\sqrt{2}$.

33. Apparatus as claimed in claim 32, wherein the ratio is less than 4.

34. Apparatus as claimed in claim 29, wherein below a second predetermined value a constant maximum attenuation factor applies, and between the first and second predetermined values the attenuation factor follows a curve, which, if continued to a point of infinite attenuation (zero amplification), gives the corresponding voltage $V_O$ which is related to the voltage $V_A$ at the first predetermined value by a ratio of at least $\sqrt{2}$.

35. Apparatus as claimed in claim 34, wherein the ratio is less than 4.

36. Apparatus as claimed in claim 28, including a low-pass filter coupled in the series circuit between the subtractor and the non-linear transfer characteristic means.

37. Apparatus for reducing the effect of noise in an electrical signal which is obtained by scanning, said apparatus comprising:
input and output terminals;
a delay device coupled to the output terminal for providing a delay time of substantially one scan; and
means coupled to the input terminal and to the output of the delay device for attenuating differences between the input signal during the current scan and the output signal during a preceding scan to provide an output signal which is applied to the output terminal;
said means including a subtractor coupled to the input terminal and the the output of the delay device for providing a difference signal, and an attenuation circuit operative to provide a varying degree of attenuation in dependence upon said difference signal;
the attenuation circuit comprising:
rectifying means coupled to the output of the subtractor;
non-linear transfer characteristic means coupled to the output of the rectifying means;
multiplier means coupled to the output of the non-linear transfer characteristic means; and
an adder coupled between the output of the multiplier means and the output terminal.

38. Apparatus as claimed in claim 37, wherein the non-linear means has a characteristic such that above a predetermined value a constant predetermined minimum attenuation factor applies.

39. Apparatus as claimed in claim 37, including a low-pass filter coupled in series with the rectifying means between the subtractor and the non-linear means.

40. Apparatus as claimed in claim 37, including a variable-gain element coupled between the output of the rectifying means and the non-linear means.

41. Apparatus as claimed in claim 40, including a low-pass filter coupled between the output of the rectifying means and the non-linear means.

42. Apparatus for reducing the effect of noise in an electrical signal which is obtained by scanning, said apparatus comprising:
input and output terminals;
a delay device coupled to the output terminal for providing a delay time of substantially one scan; and
means coupled to the input terminal and to the output of the delay device for attenuating differences between the input signal during the current scan and the output signal during a preceding scan to provide an output signal which is applied to the output terminal;
said means including a subtractor coupled to the input terminal and to the output of the delay device for providing a difference signal, and an attenuation circuit operative to provide a varying degree of attenuation in dependence upon said difference signal;
the attenuation circuit comprising:
non-linear transfer characteristic means coupled to the output of the subtractor, the non-linear means having a characteristic such that at a predetermined value there is a discontinuity in the slope of the characteristic above which a constant predetermined minimum attenuation factor applies;
multiplier means coupled to the output of the non-linear transfer characteristic means; and
an adder coupled between the output of the multiplier means and the output terminal.

43. Apparatus as claimed in claim 42, wherein the predetermined minimum attenuation factor is unity.

44. Apparatus as claimed in claim 43, wherein below a second predetermined value a constant maximum attenuation factor applies, and between the first and second predetermined values the attenuation factor follows a curve given substantially by the function:

$$C(1-x^{-2})$$

where x is the voltage in arbitrary units, and C is a constant whose value lies between 1 and 2.

45. Apparatus as claimed in claim 44, wherein the constant C has a value of about (9/8).

46. Apparatus as claimed in claim 44, wherein if the curve is continued to a point of infinite attenuation (zero amplification) the corresponding voltage $V_O$ is related to the voltage $V_A$ at the first predetermined value by a ratio of at least $\sqrt{2}$.

47. Apparatus as claimed in claim 46, wherein the ratio is less than 4.

48. Apparatus as claimed in claim 43, wherein below a second predetermined value a constant maximum attenuation factor applies, and between the first and second predetermined values the attenuation factor follows a curve, which, if continued to a point of infinite attenuation (zero amplification), gives the corresponding voltage $V_O$ which is related to the voltage $V_A$ at the first predetermined value by a ratio of at least $\sqrt{2}$.

49. Apparatus as claimed in claim 48, wherein the ratio is less than 4.

50. Apparatus as claimed in claim 42, including a low-pass filter coupled between the subtractor and the non-linear means.

51. Apparatus as claimed in claim 50, wherein the low-pass filter comprises a two-dimensional averager.

52. Apparatus for reducing the effect of noise in an electrical signal which is obtained by scanning, said apparatus comprising:

input and output terminals;

a delay device coupled to the output terminal for providing a delay time of substantially one scan; and means coupled to the input terminal and to the output of the delay device for attenuating differences between the input signal during the current scan and the output signal during a preceding scan to provide an output signal which is applied to the output terminal;

said means including a subtractor coupled to the input terminal and to the output of the delay device for providing a difference signal, and an attenuation circuit operative to provide a varying degree of attenuation in dependence upon said difference signal;

the attenuation circuit comprising:

a variable-gain element coupled to the output of the subtractor;

non-linear transfer characteristic means coupled to the output of the variable-gain element;

multiplier means coupled to the output of the non-linear transfer characteristic means; and an adder coupled between the output of the multiplier means and the output terminal.

53. Apparatus as claimed in claim 52, wherein the non-linear means has a characteristic such that above a predetermined value a constant predetermined minimum attenuation factor applies.

54. Apparatus as claimed in claim 52, including a low-pass filter coupled in series with the rectifying means between the subtractor and the non-linear means.

* * * * *